Figure 1:
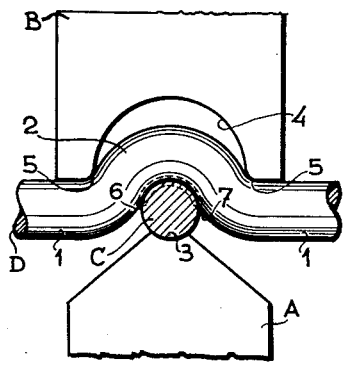

May 29, 1962     L. J. POILLEVEY     3,037,108

DEVICE FOR RESISTANCE WELDING TWO OBJECTS

Filed Oct. 27, 1959

United States Patent Office 3,037,108
Patented May 29, 1962

3,037,108
DEVICE FOR RESISTANCE WELDING TWO OBJECTS
Leon Joseph Poillevey, Grenoble, France (99 Laan Copes van Cattenburch, The Hague, Netherlands)
Filed Oct. 27, 1959, Ser. No. 848,934
Claims priority, application France Oct. 28, 1958
6 Claims. (Cl. 219—56)

This invention relates to a device for resistance welding two objects.

In itself, resistance welding, which is sometimes referred to as spot welding, is known. In order to effect spot welding the objects to be welded are usually placed between two electrodes, after which the electrodes are pressed together and a welding current is fed through the electrodes and the objects clamped between them. The welding current passes through the objects substantially along the shortest path between the electrodes and heats the objects mainly at the spot where they touch each other. At that spot, the objects to be welded are heated to such an extent that they melt locally, so that after switching off the current and enabling the objects to cool the objects remain fused together. Since the heating is substantially localized at the spot where the shortest current path crosses the contact area between the objects only a small part of the objects to be welded together melts, so that in general a lenticular welding joint results. Due to the relatively small dimensions of the welding joint the bond effected in this way is comparatively weak, which for many purposes is a disadvantage.

If the objects to be welded meet along a large area it is possible to effect several welding joints of the above described type at various places, whereby a better strength is obtained than would be obtainable by a single welding joint. However, this is impossible if the objects to be welded touch each other only over a restricted area, which for instance applies if the objects consist of two crossed wires, bars or tubes.

Joints of that kind are for example required in the manufacture of wire baskets which consist of a number of thick metal wires which are welded to transverse wires by which they are interconnected. Baskets made of welded metal wires are usually preferred to baskets made of a woven wire mesh, since the latter are less robust and more apt to get clogged by dirt. Since baskets of the type referred to are frequently exposed to rough handling the welding joints should have adequate strength, as otherwise the inherent strength of the metal wires themselves is not fully taken advantage of. It has been proven to be impossible to join metal wires in the above described manner and nevertheless obtain a welding joint the strength of which is comparable to the strength of the wires themselves.

It is an object of the invention to provide a device by means of which two crossing wires, bars or tubes can be welded together in such a way that the strength of the welding joint is not materially less than the strength of the wires, bars or tubes themselves.

According to the invention a device for resistance welding two objects comprises a first electrode, adapted for connection to a source of welding current and provided with contact pieces which if the electrode is pressed onto one of the objects to be welded contact said object at two spots, one at each side of the spot where the objects to be welded touch each other, and a second electrode, also adapted for connection to said source of welding current, the latter electrode being so shaped as to contact the other object to be welded at a place between the spots where the first object contacts the first electrode.

Thereby the welding current is spread out over a greater part of the contact area between the objects to be welded, whereby a larger welding joint and therefore a joint of greater strength is obtained.

Moreover, a device as described above enables to deform one of the objects to be welded during the welding process to a desired shape, thus obviating a separate deforming step. This is due to the fact that the first electrode touches the first object to be welded at both sides of the welding joint, instead of above the welding joint, as is the case ordinarily.

Figure 2:
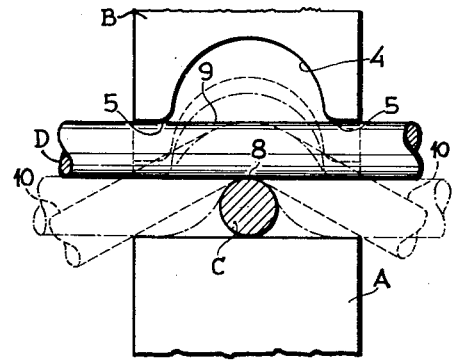

These and other features and advantages will be more apparent after a perusal of the following specification taken in connection with the accompanying drawing, wherein FIGURE 1 is an elevation of a device according to the invention, adapted for welding two wires, bars or tubes, one of which is provided with an undulation in which the other wire, bar or tube fits, FIGURE 2 is an elevation of a similar device as depicted in FIGURE 1, adapted for welding two straight wires, bars or tubes, one of which is so deformed during the welding process that after welding a similar configuration as depicted in FIGURE 1 is obtained.

Figure 3:
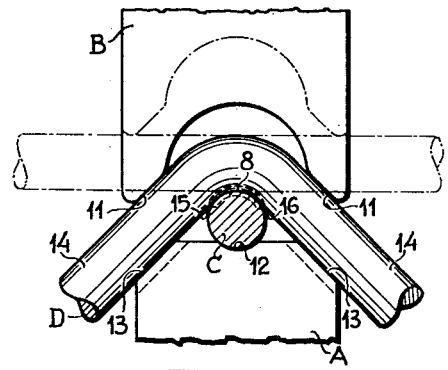
Figure 4:
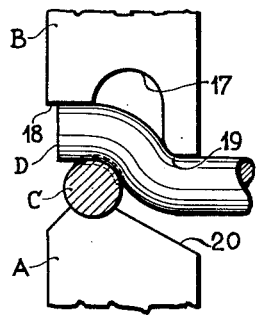
Figure 5:
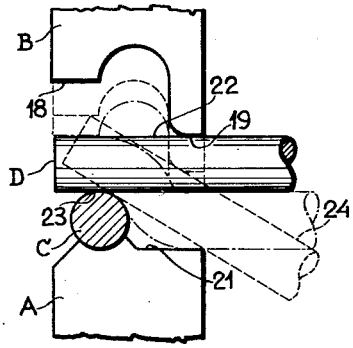

FIGURE 3 is an elevation of a device according to the invention, adapted for welding two straight wires, bars or tubes in such a way that after welding one of the wires, bars or tubes is bent over a certain angle, the other wire, bar or tube being welded in the bend, FIGURE 4 is an elevation of a device according to the invention, adapted for welding a preformed extremity of a first wire, bar or tube to a second wire, bar or tube, FIGURE 5 is an elevation of a device according to the invention, adapted for welding the extremity of a first straight wire, bar or tube to a second straight wire, bar or tube in such a way that after welding a similar configuration as shown in FIGURE 4 is obtained.

In all figures of the drawing the lower electrode is indicated at A, the upper electrode is indicated at B, the lower wire, bar or tube is indicated at C and the upper wire, bar or tube is indicated at D.

In FIGURE 1 the upper wire, bar or tube D is preformed so as to comprise a bend 2 between both straight parts 1, said bend fitting around the lower wire, bar or tube C, so that the axes of the parts 1 and the wire, bar or tube C respectively are coplanar.

The extremity of the lower electrode A, which supports the wire C, is so shaped that it does not touch the upper wire D. Preferably the extremity of the electrode A is provided with a hollow seat 3 for the wire C. The upper electrode B is provided with a central depression 4, at both sides of which contact pieces 5 are provided, the latter contacting the parts 1 of the wire D near the bend 2, said depression being so shaped that the electrode B does not touch the wire D at any place between the contact pieces 5. If the wires C and D are pressed together by means of the electrodes A and B they contact each other over the area which is indicated by dotted lines between 6 and 7. The wire C engages the electrode A in the seat 3 and the wire D engages the electrode D at the contact pieces 5, which are situated on both sides of the bend 2 and therefore on both sides of the contact area 6—7. On switching on the current passes through the part of the wire D between the contact pieces 5, whereby this entire part is heated, which results in the entire contact area 6—7 melting. In this way a crescent shaped welding joint extending along the full length of the contact area is effected.

If, as is customary, two planar electrodes would be employed the welding current would be concentrated in a relatively small region, which would result in a welding joint of smaller dimensions and consequently having smaller strength than a welding joint obtained by means of a device according to the invention.

Moreover, it is possible to make use of the heating of the part of the wire D between the contact pieces 5 for deforming the wire D during the welding process. This enables to start with two straight wires and nevertheless obtain a configuration as shown in FIGURE 1 after welding.

A device adapted for that purpose is shown in FIGURE 2. At first the straight wires to be welded together touch each other only at the spot 8. As in FIGURE 1 the upper electrode B is provided a central depression, whereas the lower electrode A is planar in this instance. The planar part of the lower electrode A is at least as large as the upper electrode B.

On switching on the current the part of the wire D between the contact pieces 5 is heated to a red glow, during which the material at the contact place 8 melts. The pressure which the contact pieces 5 exert on the wire D forces the wire D around the wire C, whereby the contact area between the wires C and D is extended and as a consequence the welding joint is extended as well. The parts 10 of the wire D are pressed down so far by the contact pieces 5 that ultimately they touch the edges of the electrode A, which enables the current to pass from the wire D directly to the electrode A without flowing through the welding joint 8. As a consequence the central part of the wire D is no longer heated while on the other hand the heating of the parts touching the lower electrode A is increased, weakening these parts to such an extent that the pressure exerted on the electrodes deforms these parts to attain a coextensive position. In this way a similar joint is obtained ts the joint effected by the device according to FIGURE 1, with the exception that in this case no preforming of one of the wires is required, one of the wires being deformed during the welding process.

The same feature can also be used for bending one of the wires to be welded in such a way during the welding process that the other wire is welded to the first wire in the bend thereof.

A device suitable for that purpose is shown in FIGURE 3. There also the upper electrode B is provided with a depression and two contact pieces 11. The lower electrode A is similarly shaped as the lower electrode shown in FIGURE 1 and is also provided with a groove 12 for positioning the lower wire C. The width of the electrode A is so chosen as not to prevent forming a bend in the wire D. To that end beveled edges 13 can be provided on the electrode, the beveled edges 13 serving as seats for the wire D once it is bent. As in the devices shown in FIGURES 1 and 2 the upper electrode is provided with a depression and contact pieces 11, the surfaces of which are in this case arranged at an angle which corresponds to the angle through which the wire D is to be bent. Preferably the surfaces of the contact pieces 11 are parallel to the beveled edges 13. The operation of the device is similar to the operation of the device shown in FIGURE 2. On establishing the contact and switching on the welding current the section of the wire D between the contact pieces 11 is heated to a red glow, which enables the electrode B to force the wire D around the wire C, whilst the wires C and D fuse at the contact place 8. The bending of the wire D is stopped and the heating is finished as soon as the parts 14 of the wire D touch the beveled edges 13. In this stage the wires are welded together over the entire crescent shaped area 15—16. If the wire D would be preformed before welding a narrow lower electrode A, as shown in FIGURE 1, would be necessary in order to prevent the wire D from touching the electrode A before a welding joint has been effected.

It is possible to weld an extremity of a wire to a second wire in a similar way. Devices which are suitable for that purpose are shown in FIGURES 4 and 5. In this case at both sides of the depression 17 of the electrode B asymmetrical contact pieces 18 and 19 are provided, the difference in height of these contact pieces being equal to the diameter of the wire to be welded. If the extremity to be welded of the wire D is preformed (FIGURE 4) the lower electrode A should be provided with a beveled edge in order to prevent the wire D from directly contacting the electrode A. However, if straight wires are employed which are to be bent to the desired shape during the welding process (FIGURE 5) the lower electrode A should be provided with a supporting surface 21 against which the wire D is pressed during the heating action and which brings the wire in the desired position.

In latter case the electrode B at first engages the wire D only through the contact piece 19. The resulting flow of current through the part 22 of the wire D between the contact piece 19 and the contact area 23 with the wire C locally heats the wire D to a red glow, so that the wire D is forced around the wire C due to the pressure exerted by the electrodes, which results in the extremity of the wire D engaging the contact piece 18. Thereby the wire D is forced around the wire C still further, until the part 24 of the wire D engages the supporting surface 21 of the electrode A and is deflected thereby. In this way too a crescent shaped welding joint is effected.

As already stated above the devices described are also suited for welding bars or tubes instead of wires. Moreover, devices of the kind disclosed above are with slight modifications equally well suited for welding together objects which do not touch each other at a mere point or line, but which have a contact surface in common. In that case the electrode which is provided with a depression may engage one of the objects to be welded over an annular surface area, the other electrode engaging the other object to be welded over a surface area which is centered with respect to the annular surface area.

There has thus been described welding apparatus in which a first electrode is provided with two spaced contact tips extending therefrom. The tips contact a first of two objects to be welded together at each side of a point where the objects to be welded initially touch each other. The first electrode has a recess formed between the contact tips of a depth which prevents the first object from touching the surface of the recess at any time during the welding and bending process while allowing the contact tips to increase their area of contact slightly with the first object as the first object bends. A second electrode, also adapted for connection to the source of welding current, is positioned to engage a second to the two objects being welded opposite the point where the two objects initially touch.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What I claim is:

1. Welding apparatus, comprising; a first electrode adapted for connection to a source of welding current; said first electrode having two spaced contact tips extending from said first electrode for contacting a first of two objects to be welded together at each side of a point where the objects to be welded initially touch each other; said first electrode having a recess formed between said contact tips of a depth which prevents said first object from touching the surface of said recess at any time during the welding and bending process while allowing said contact tips to increase their area of contact with said first object as the first object bends; and a second electrode also adapted for connection to said source of welding current; said second electrode being positioned to engage a second of said two objects opposite said point where said objects initially touch.

2. Welding apparatus, comprising; a first electrode adapted for connection to a source of welding current; said first electrode having two spaced contact tips extending from said first electrode for contacting a first of two objects to be welded together at each side of a point where the objects to be welded initially touch each other; said first electrode having a recess formed between said contact tips of a depth which prevents said first object from touching the surface of said recess at any time during the welding and bending process while allowing said contact tips to increase their area of contact with said first object as the first object bends; and a second electrode also adapted for connection to said source of welding current; said second electrode being positioned to engage a second of said two objects opposite said point where said objects initially touch; said second electrode being provided with at least one supporting surface operative to deflect said first object to a desired position in cooperation with said spaced contact members of said first electrode during a welding process.

3. Welding apparatus, comprising; a first electrode adapted for connection to a source of welding current; said first electrode having two spaced contact tips extending from said first electrode for contacting a first of two object to be welded together at each side of a point where the objects to be welded initially touch each other; said first electrode having a recess formed between said contact tips of a depth which prevents said first object from contacting the surface of said recess at any time during the welding and bending process while allowing said contact tips to increase their area of contact with said first object as the first object bends; and a second electrode also adapted for connection to said source of welding current; said second electrode being positioned to engage a second of said two objects opposite said point where said objects initially touch; said second electrode being provided with supporting surfaces operative to deflect said first object to a desired shape when pressure on the electrodes in cooperation with the heating from the welding process forces said first object around said second object.

4. Welding apparatus, comprising; a first electrode adapted for connection to a source of welding current; said first electrode having two spaced contact tips extending from said first electrode for contacting a first of two objects to be welded together at each side of a point where the objects to be welded initially touch each other; said first electrode having a recess formed between said contact tips of a depth which prevents said first object from contacting the surface of said recess at any time during the welding and bending process while allowing said contact tips to increase their area of contact with said first object as the first object bends; and a second electrode also adapted for connection to said source of welding current; said second electrode being positioned to engage a second of said two objects opposite said point where said objects initially touch; said second electrode being provided with two supporting surfaces in alignment with said two spaced contact tips of said first electrode; said supporting surfaces being operative to deflect said first object to a desired shape when pressure on the electrodes in cooperation with the heating from the welding process forces said first object around said second object.

5. Welding apparatus for welding two crossed wires, bars, or tubes when one of said wires, bars or tubes is formed in a bend around the other, comprising; a first electrode adapted for connection to a source of welding current; said first electrode having two spaced contact tips to be applied to said one wire on opposite sides of said bend; said first electrode having a recess formed between said contact tips of a depth preventing the bend in said wire from contacting the electrode at any place other than the tips at any time during the welding process; and a second electrode also adapted for connection to said source of welding current; said second electrode being positioned to engage said other wire opposite where said other wire touches said one wire within said bend.

6. Welding apparatus for welding two crossed wires, bars, or tubes when an extremity of one wire, bar, or tube is formed in a half U-shaped bend around the other, comprising; a first electrode adapted for connection to a source of welding current; said first electrode having two spaced contact tips, a first contact tip contacting said one wire in the proximity of the extremity of the bend, a second contact tip contacting said one wire before the bend formation; said first electrode having a recess formed between said spaced contact tips preventing said bend from contacting said electrode at any place other than the tips at any time during the welding process; and a second electrode also adapted for connection to said source of welding current; said second electrode being positioned to engage said other wire opposite where said other wire touches said one wire within said bend.

References Cited in the file of this patent

UNITED STATES PATENTS 2,379,135 Ekstedt _____ June 26, 1945

FOREIGN PATENTS 709,994 France _____ May 26, 1931